(12) United States Patent
Wang

(10) Patent No.: US 9,530,126 B2
(45) Date of Patent: Dec. 27, 2016

(54) SECURE MOBILE PAYMENT PROCESSING

(75) Inventor: Ruihua Wang, Beijing (CN)

(73) Assignee: Alibaba Group Holding Limited (KY)

( * ) Notice: Subject to any disclaimer, the term of this patent is extended or adjusted under 35 U.S.C. 154(b) by 720 days.

(21) Appl. No.: 12/952,074

(22) Filed: Nov. 22, 2010

(65) Prior Publication Data

US 2011/0131102 A1 Jun. 2, 2011

(30) Foreign Application Priority Data

Nov. 27, 2009 (CN) .......................... 2009 1 0225691

(51) Int. Cl.
*G06Q 20/38* (2012.01)
*G06Q 20/10* (2012.01)
*G06Q 20/20* (2012.01)
*G06Q 20/32* (2012.01)

(52) U.S. Cl.
CPC .......... *G06Q 20/3823* (2013.01); *G06Q 20/10* (2013.01); *G06Q 20/20* (2013.01); *G06Q 20/32* (2013.01); *G06Q 20/322* (2013.01); *G06Q 20/327* (2013.01)

(58) Field of Classification Search
None
See application file for complete search history.

(56) References Cited

U.S. PATENT DOCUMENTS

| | | | |
|---|---|---|---|
| 5,790,677 A | 8/1998 | Fox et al. | |
| 5,978,840 A * | 11/1999 | Nguyen et al. | ............... 709/217 |
| 6,560,581 B1 | 5/2003 | Fox et al. | |
| 7,162,435 B1 * | 1/2007 | Nagano | .................. G06Q 20/20 235/385 |
| 7,757,945 B2 * | 7/2010 | Gray | ...................... G06Q 20/10 235/380 |
| 2002/0046189 A1 * | 4/2002 | Morita | ................... G06Q 20/04 705/67 |

(Continued)

FOREIGN PATENT DOCUMENTS

| | | |
|---|---|---|
| CN | 101221641 A | 7/2008 |
| CN | 101482950 | 7/2009 |

(Continued)

OTHER PUBLICATIONS

Anonymous, "HTTPS—Wikipedia" Webpage access Oct. 10, 2015 at https://en.wikipedia.org/w/index.php?title=HTTPS&oldid=327543731.

*Primary Examiner* — Ryan Zeender
*Assistant Examiner* — Denisse Ortiz Roman
(74) *Attorney, Agent, or Firm* — Van Pelt, Yi & James LLP

(57) ABSTRACT

A system for processing payment data includes a payer terminal, a recipient terminal, and a payment server. The payer terminal is adapted to return, to the recipient terminal, encrypted payment request data upon reception of the recipient information transmitted from the recipient terminal, wherein the payment request data comprises payer information, recipient information and a payment amount. The recipient terminal is adapted to forward the encrypted payment request data and the payment amount to the payment server. The payment server is adapted to verify the encrypted payment request data and the payment amount, to perform a payment according to a verification result, and to return encrypted payment result data to the recipient terminal. The recipient terminal is further adapted to return the encrypted payment result data to the payer terminal.

15 Claims, 7 Drawing Sheets

(56) References Cited

U.S. PATENT DOCUMENTS

| | | |
|---|---|---|
| 2002/0069177 A1 | 6/2002 | Carrott et al. |
| 2005/0177495 A1 | 8/2005 | Crosson Smith |
| 2005/0177521 A1 | 8/2005 | Crosson Smith |
| 2006/0004658 A1 | 1/2006 | Chau et al. |
| 2007/0022058 A1 | 1/2007 | Labrou et al. |
| 2007/0150413 A1 | 6/2007 | Morgenstern |
| 2007/0255652 A1* | 11/2007 | Tumminaro et al. .......... 705/39 |
| 2009/0006262 A1 | 1/2009 | Brown et al. |
| 2009/0144205 A1 | 6/2009 | Hurry |

FOREIGN PATENT DOCUMENTS

| | | |
|---|---|---|
| CN | 101546401 | 9/2009 |
| EP | 1030272 | 8/2000 |
| JP | 2003296652 | 10/2003 |
| WO | 9813797 | 4/1998 |
| WO | 9834203 | 8/1998 |

\* cited by examiner

SECURE MOBILE PAYMENT PROCESSING

CROSS REFERENCE TO OTHER APPLICATIONS

This application claims priority to People's Republic of China Patent Application No. 200910225691.4 entitled METHOD AND SYSTEM FOR PROCESSING PAYMENT DATA, PAYMENT TERMINAL AND PAYMENT SERVER filed Nov. 27, 2009 which is incorporated herein by reference for all purposes.

FIELD OF THE INVENTION

The present application relates to the field of electronic commerce and in particular to electronic payment processing.

BACKGROUND OF THE INVENTION

Electronic payment has become widely used. Typically, an enterprise or individual issues a payment instruction to a financial institution such as a bank, directly or indirectly via an electronic terminal, to perform a cash payment and fund transfer. A common form of electronic payment is a payment at a point of sale terminal (e.g., the purchase of a product at a store), which requires both a bank card and a point of sale device networked with a bank for processing money transfer from the bank account of the buyer to that of the seller.

As mobile devices such as smart phones become more popular, more and more electronic payments are made through mobile terminals instead of using bank cards. This kind of payment is referred to mobile payment. The typical mobile payment system requires an intelligent chip to be added to a mobile phone or an existing SIM card to be modified, as well as a payment processing device to be installed at a point of sale. These requirements are often costly and complex to implement, thus hindering the wide adoption of mobile payment. Moreover, the security features of the typical mobile payment systems tend to be minimal or even nonexistent.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
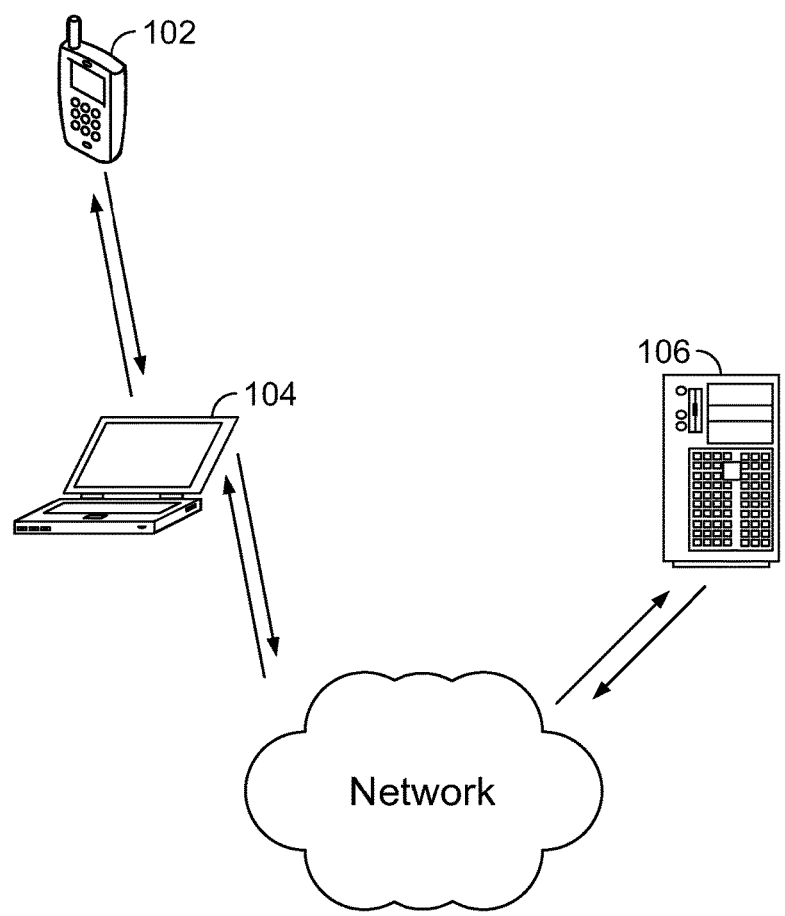
FIG. 1 is a block diagram illustrating an embodiment of a mobile payment processing system.

FIG. 1 is a block diagram illustrating an embodiment of a mobile payment processing system. Platform 100 includes a payer terminal 102, a payment (recipient) terminal 104, and a payment server 106. The payment server can be a payment server connected with a bank over a network or a dedicated line. In some embodiments, the payment server is provided by a creditable third-party payment service provider such as Alipay.com. The payer terminal and the recipient terminal can be any suitable electronic device with communication capabilities, in particular a portable electronic terminal, such as a mobile phone, a Personal Digital Assistant (PDA), a notebook computer, etc.

In the embodiment shown, the payment server provides, via the network, electronic payment client software to be installed on the payer and the recipient terminals. On the payer terminal, the payment client software provides the capability of making a payment. On the recipient terminal, the payment client software provides the capability of collecting the payment. Particularly, the recipient terminal and the payment server can communicate over the Internet, a wireless network, a dedicated network or any other appropriate connection, but the payer terminal does not send data directly to or receive data directly from the payment server.

The payer terminal connects and interacts with the recipient terminal via a wire line or a wireless connection but does not directly connect with the payment server. In some embodiments, the payer terminal and the recipient terminal are connected upon the initiation of a payment process. For example, the payer terminal (e.g., a mobile phone) and the recipient terminal (e.g., a computer) can be connected over a mini-USB line. The payer terminal and the recipient terminal can alternatively be connected wirelessly, e.g., via Bluetooth, infrared, WIFI, etc.

The recipient terminal connects with the payment server over a network (such as a wide area network or the Internet). The recipient terminal facilitates data exchange between the payer terminal and the payment server by receiving and forwarding data.

As will be described in greater detail below, the configuration allows the payer to make electronic payments securely and rapidly.

Figure 2A:
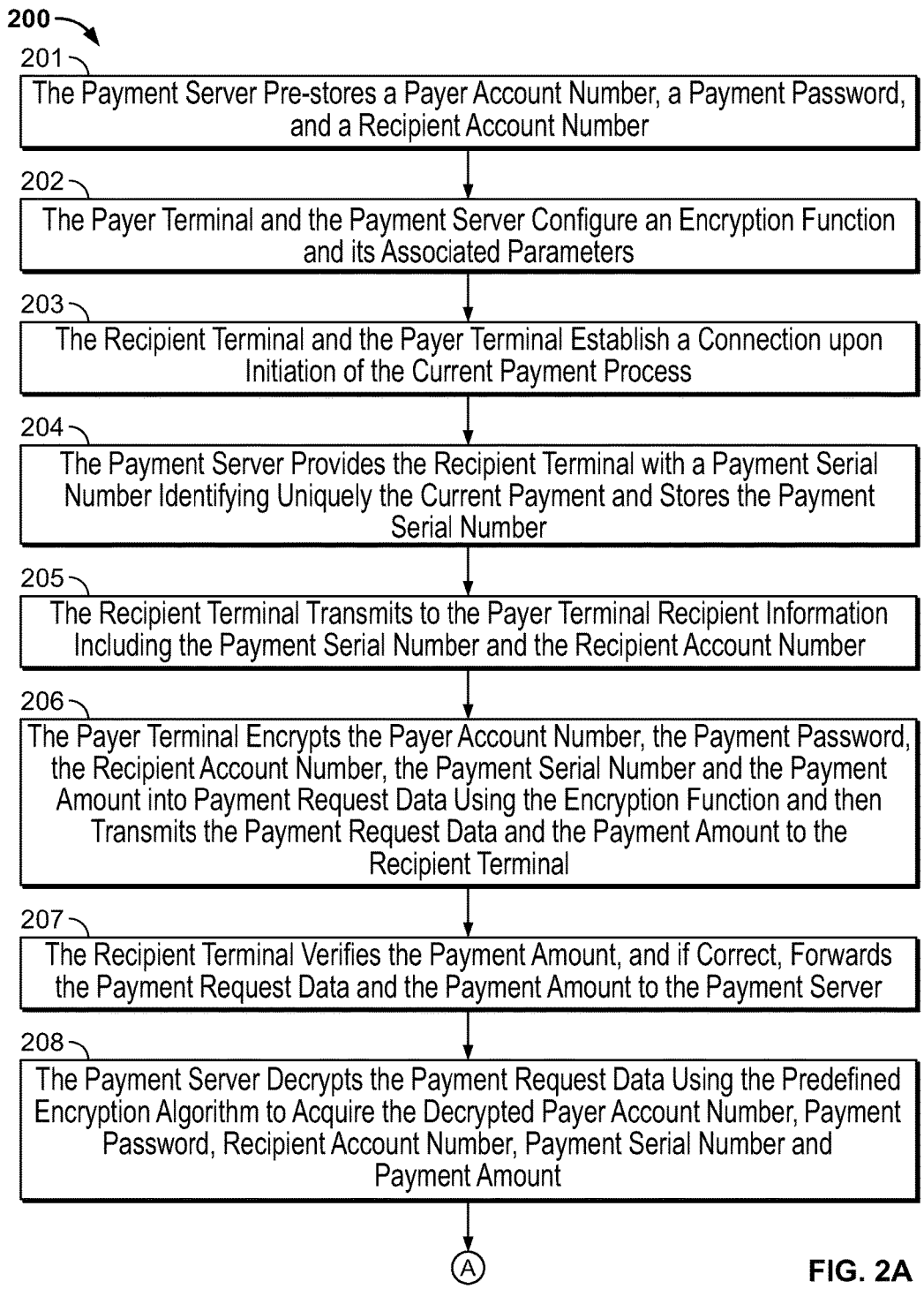
FIGS. 2A-2B are flowcharts illustrating an embodiment of a procedure for processing payment data.
Figure 2B:
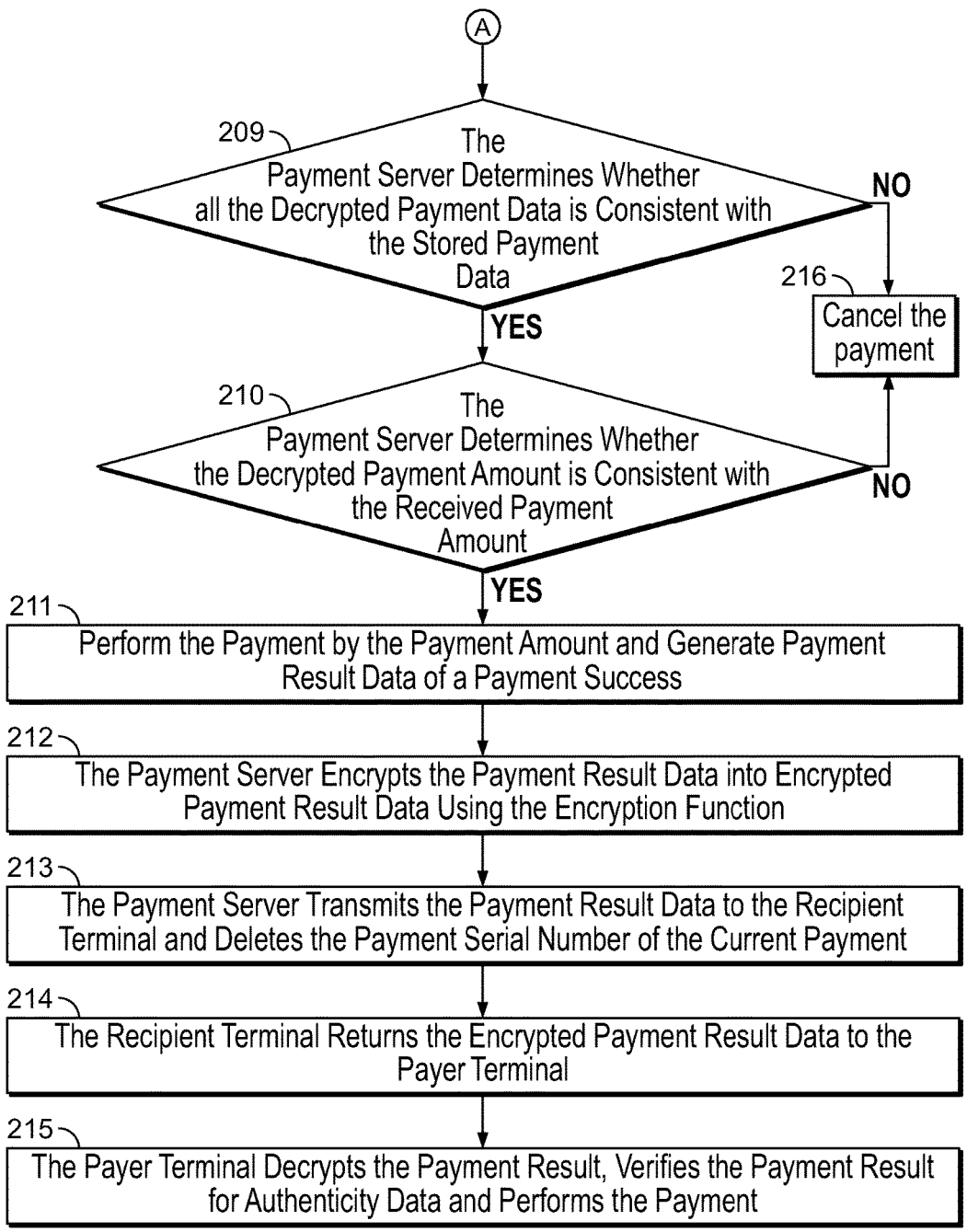

Payment data processing by platform 100 is described in connection with FIGS. 2A-2B, which are flowcharts illustrating an embodiment of a procedure for processing payment data. Process 200 may be performed on a payment processing platform such as 100.

The payer terminal and the recipient terminal are configured to have a payer account number and a recipient account number, respectively. At 201, the payment server pre-stores the payer account number and a payment password associated with the payer terminal, as well as the recipient account number associated with the recipient terminal.

At 202, the payer terminal and the payment server configure an encryption function and its associated parameters. In some embodiments, the definition of the encryption function and the parameters are pre-stored in a file accessible by the payer terminal and the payment server and loaded by the devices during configuration setup.

The predefined encryption function is unknown to the recipient terminal to ensure the security of transmission of the payment data between the payer terminal and the payment server. In other words, the recipient terminal is unable to decrypt the encrypted data. For example, in some embodiments, the RSA encryption function is implemented as the predefined encryption function. The RSA algorithm encrypts data using a public key and can only be decrypted by using a private key. Accordingly, the payment server has a private key that is kept secret and discloses a corresponding public key. The payer terminal encrypts payment request data with the public key and sends the encrypted information to the recipient terminal. Since the private key of the payment server is unknown to the recipient terminal or another third party, the payment request data cannot be decrypted, forged, or otherwise tampered by the recipient terminal.

In this example, a connection based protocol is used. At 203, the recipient terminal and the payer terminal establish a connection upon initiation of the current payment process. The payer terminal and the recipient terminal can be connected using a wired connection upon initiation of the current payment. For example, a payer terminal that is a mobile phone and a recipient terminal that is a computer can be connected over a mini-USB line. The payer terminal and the recipient terminal can alternatively be connected wirelessly using wireless protocols such as Bluetooth, infrared, WIFI, etc.

In some embodiments, instead of a direct connection, the payer terminal and the recipient terminal communicate through a data relay device, e.g., a memory card, a hard disk, etc.

At 204, the payment server provides the recipient terminal with a payment serial number uniquely identifying the current payment and stores the payment serial number. The payment serial number can be a random number allocated by the payment server for the recipient terminal upon initiation of a payment or generated by a predefined algorithm agreed upon by the payment server and the recipient terminal. For example, in some embodiments, the algorithm increments a predefined count every time a payment is successfully made and uses the resulting value as the serial number.

At 205, the recipient terminal transmits to the payer terminal recipient information including the payment serial number and the recipient account number. The recipient information transmitted from the recipient terminal to the payer terminal includes the recipient account number and the payment serial number provided by the payment server and optionally may include a payment amount confirmed by the recipient terminal.

At 206, the payer terminal encrypts the payer account number, the payment password, the recipient account number, the payment serial number, and the payment amount into payment request data using the encryption function, and transmits the encrypted payment request data to the recipient terminal.

In steps 205 and 206, if the payment amount is sent from the recipient terminal to the payer terminal, the payment amount included in the encrypted payment request data returned from the payer terminal is the payment amount from the recipient terminal. Alternatively, if the recipient terminal does not send any payment amount to the payer terminal, then the payment amount included in the encrypted payment request data returned from the payer terminal is a payment amount input by the payer terminal. The recipient terminal receives the encrypted payment request data and the payment amount input by the payer terminal.

At 207, the recipient terminal verifies the payment amount. If the amount is correct, the recipient terminal forwards the encrypted payment request data and the payment amount to the payment server. Verification is needed when the recipient terminal does not send any payment amount to the payer terminal in step 205, and the payment amount included in the encrypted payment request data returned from the payer terminal is a payment amount input by the payer terminal. When the recipient terminal receives the encrypted payment request data and the payment amount input by the payer terminal returned from the payer terminal, the recipient terminal first verifies the payment amount for correctness. In one example, the encrypted payment amount is compared to the cost of the product that is sold. If the amount is correct, the recipient terminal forwards the encrypted payment request data and the payment amount to the payment server.

At 208, the payment server decrypts the payment request data using the predefined encryption function to acquire the decrypted payer account number, payment password, recipient account number, payment serial number, and payment amount.

At 209, the payment server determines whether all the decrypted payment data is consistent with the stored payment data, and if so, the flow goes to 210, otherwise the flow goes to 216. To make the determination, the payment server reads the stored payer account number, payment password, recipient account number, and payment serial number and compares the following data for consistency: the read payer account number and the decrypted payer account number, the read payment password and the decrypted password, the read recipient account number and the decrypted recipient account number, and the read payment serial number and the decrypted payment serial number.

If all the read data and decrypted data compared in step 209 is consistent, at 210, the decrypted payment amount and the received payment amount are further compared for consistency. If the amounts match, flow control is transferred to step 211; otherwise, flow control is transferred to step 216.

At 211, a payment in the amount specified is made by the payment server. The payer's account is deducted and the recipient's account is increased by the payment amount. Payment result data indicating the success or failure of the payment process is generated depending on whether the payment is successfully completed.

At 212, the payment server encrypts the payment result data into encrypted payment result data using the encryption function.

The payment server encrypts the payment result description, the time the payment was made, the payer account number, the recipient account number, the payment amount, and the payment serial number into encrypted payment result data using the predefined encryption function and transmits the encrypted payment result data to the recipient terminal.

The time the payment was made is added in the payment result data for the purpose of further enhancing the security of the payment. The payment result data is required to be forwarded to the payer terminal through the recipient terminal, in order to avoid the payment result data being forged by the recipient terminal using past transaction data. The payer terminal can determine whether a payment is secured according to the time of performing the payment, since the time of performing the payment is a value that cannot be reused.

At 213, the payment server transmits the payment result data to the recipient terminal and deletes the payment serial number of the current payment.

At 214, the recipient terminal returns the encrypted payment result data to the payer terminal.

At 215, the payer terminal decrypts the payment result data, verifies the payment result data for authenticity, and makes the payment. The current flow ends here.

At 216, the payment is canceled, and the current flow ends.

Figure 3:
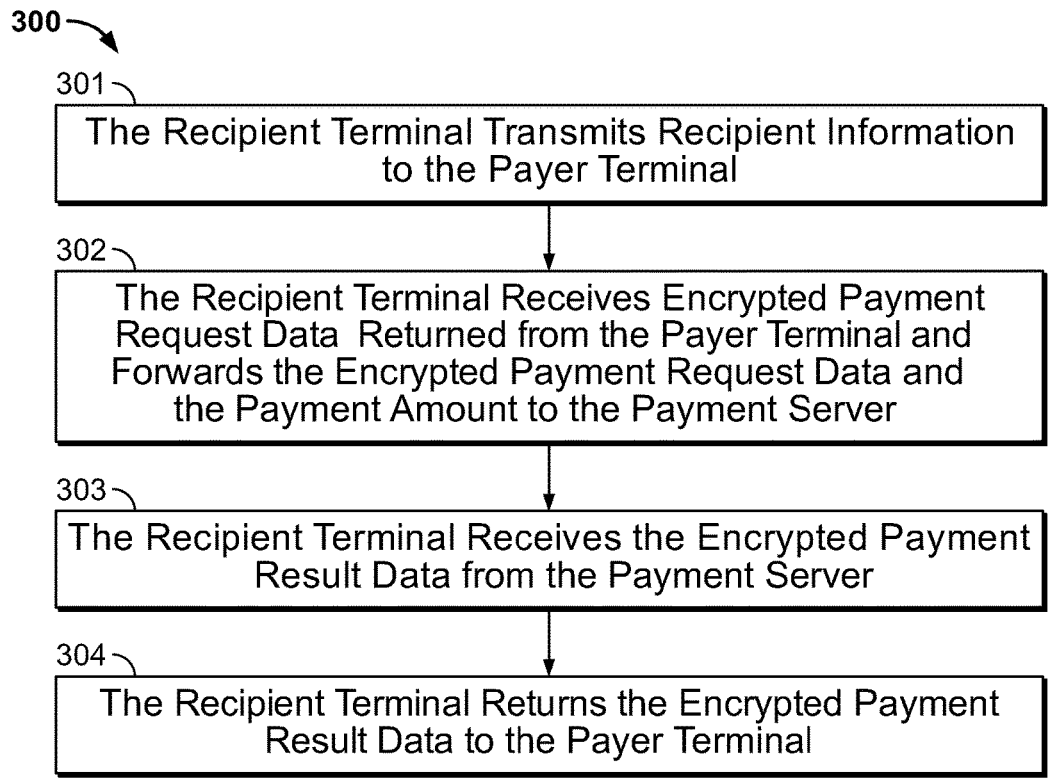
FIG. 3 is a flowchart illustrating an embodiment of a recipient terminal-side procedure for processing payment data.

FIG. 3 is a flowchart illustrating an embodiment of a recipient terminal-side procedure for processing payment data. Process 300 may be performed on a device such as recipient terminal 104 of FIG. 1.

At 301, the recipient terminal transmits recipient information to the payer terminal. The payer terminal and the recipient terminal have a payer account number and a recipient account number, respectively. The account numbers are the same as preset account numbers on the payment server. The payment server also stores a payment password of the payer terminal.

A synchronous payment serial number is used by the recipient terminal and the payment server to uniquely identify a payment. The payment serial number can be a random number allocated by the payment server for the recipient terminal upon initiation of a payment, or generated by a predefined algorithm agreed upon by the payment server and the recipient terminal. For example, in some embodiments, the algorithm increments a predefined count every time a payment is successfully made and uses the resulting value as the serial number.

Accordingly, the recipient information transmitted from the recipient terminal to the payer terminal includes the recipient account number and the payment serial number provided by the payment server for the recipient terminal. Additionally, the recipient information may also include a payment amount confirmed by the recipient terminal.

In order to ensure a secure and reliable electronic payment to be performed between the payer terminal and the payment server through the recipient terminal, the payer terminal and the payment server have predefined an encryption function that is unknown to the recipient terminal.

Once the recipient information is received, the payer terminal obtains the recipient account number and the payment serial number therein. It is also inputs the payment password and encrypts the payer account number, the payment password, the payment serial number, the recipient account number, and the payment amount according to the predefined encryption function. The encrypted payment request data is sent to the recipient terminal.

At 302, the recipient terminal receives encrypted payment request data returned from the payer terminal. Then recipient terminal forwards the encrypted payment request data and the payment amount to the payment server.

It shall be noted that if, in step 301, the recipient terminal transmits the payment amount to the payer terminal, then the payment amount included in the encrypted payment request data returned from the payer terminal is the payment amount transmitted from the recipient terminal, and the recipient terminal forwards the encrypted payment request data and the payment amount to the payment server. Alternatively, if the recipient terminal does not transmit any payment amount to the payer terminal, then the payment amount included in the encrypted payment request data returned from the payer terminal is a payment amount input by the payer terminal. The recipient terminal receives the encrypted payment request data and the payment amount input by the payer terminal returned from the payer terminal. At this time the recipient terminal can first verify the payment amount for correctness and then forward the encrypted payment request data and the payment amount to the payment server upon confirmation.

Upon receiving the encrypted payment request data and the payment amount forwarded from the recipient terminal, the payment server decrypts the encrypted payment request data using the predefined encryption function to acquire the decrypted payer account number, payment password, recipient account number, payment serial number, and payment amount. The payment server determines whether the decrypted payer account number, payment password, recipient account number, and payment serial number are consistent respectively with the pre-stored payer account number, payment password, recipient account number, and payment serial number and whether the decrypted payment amount is consistent with the received payment amount. The payment server makes the payment by the payment amount and generates payment result data of a payment success if all the data is consistent; otherwise, the payment is canceled.

If the payment succeeds, a payment result description of the payment success is generated correspondingly. If the payment is cancelled, a payment result description of the payment failure is generated correspondingly. Also the payment server encrypts the payment result description, the time of performing the payment, the payer account number, the recipient account number, the payment amount, and the payment serial number into encrypted payment result data by the predefined encryption function and transmits the encrypted payment result data to the recipient terminal.

At 303, the recipient terminal receives encrypted payment result data from the server. The encrypted payment result indicates whether a payment is successfully made by the payment server.

At 304, the recipient terminal returns the encrypted payment result data to the payer terminal, and the current flow ends.

Figure 4:
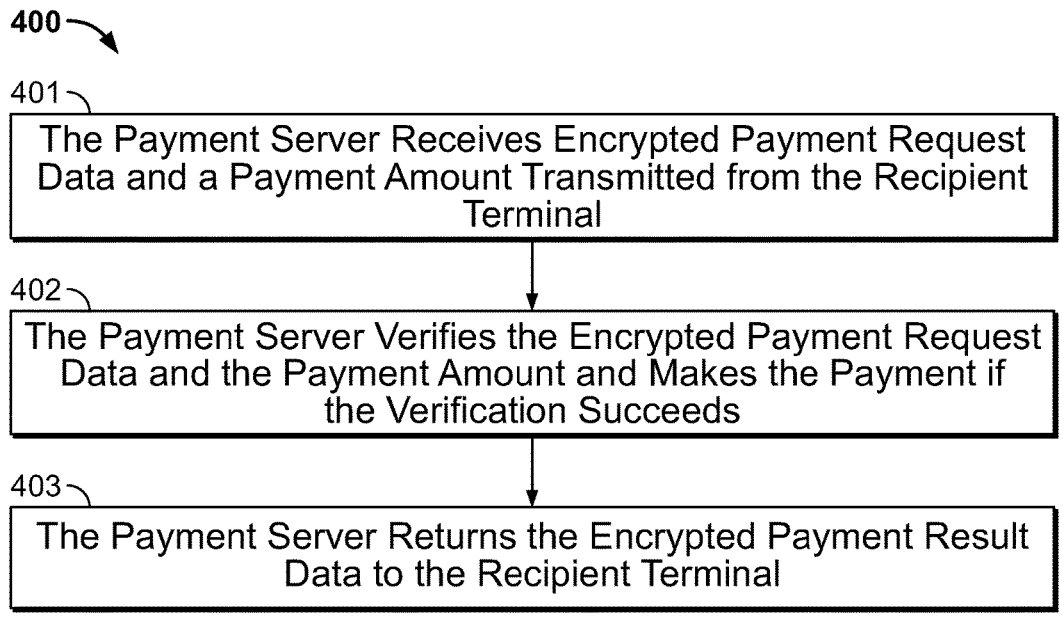
FIG. 4 is a flowchart illustrating an embodiment of a payment server-side payment data processing procedure.

FIG. 4 is a flowchart illustrating an embodiment of a payment server-side payment data processing procedure. Process 400 may be performed on a payment server such as 106 of FIG. 1.

At 401, the payment server receives encrypted payment request data and a payment amount transmitted from the recipient terminal.

The recipient terminal transmits, to the payer terminal, recipient information including the recipient account number and the payment serial number provided by the payment server for the recipient terminal and also may include a payment amount confirmed from the recipient terminal. In order to ensure a secure and reliable electronic payment to be performed between the payer terminal and the payment server through the recipient terminal, the payer terminal and the payment server have predefined an encryption function. Upon reception of the recipient information, the payer terminal acquires the recipient account number and the payment serial number therein and is also required to input the payment password and then encrypts the payer account number, the payment password, the payment serial number, the recipient account number, and the payment amount into encrypted payment request data by the predefined encryption function and transmits the encrypted payment request data to the recipient terminal. The recipient terminal forwards the encrypted payment request data and the payment amount to the payment server.

At 402, the payment server verifies the encrypted payment request data and the payment amount and performs the payment if the verification succeeds.

Upon reception of the encrypted payment request data and the payment amount forwarded from the recipient terminal, the payment server decrypts the encrypted payment request data using the predefined encryption function to acquire the decrypted payer account number, payment password, recipient account number, payment serial number, and payment amount and determines whether the decrypted payer account number, payment password, recipient account number, and payment serial number are consistent respectively with the pre-stored payer account number, payment password, recipient account number, and payment serial number. The server further determines whether the decrypted payment amount is consistent with the received payment amount and makes the payment in the payment amount. The server generates a payment result data indicating success if all the data is consistent and the payment is successfully made. Otherwise, the payment is canceled and the payment result data indicates a payment failure.

If the payment succeeds, a payment result description of the payment success is generated correspondingly, or if the payment is cancelled, a payment result description of the payment failure is generated correspondingly. Also the payment server encrypts the payment result description, the time of performing the payment, the payer account number, the recipient account number, the payment amount, and the payment serial number into encrypted payment result data by the predefined encryption function and transmits the encrypted payment result data to the recipient terminal.

At 403, the payment server returns the encrypted payment result data to the recipient terminal, and the current flow ends.

Figure 5:
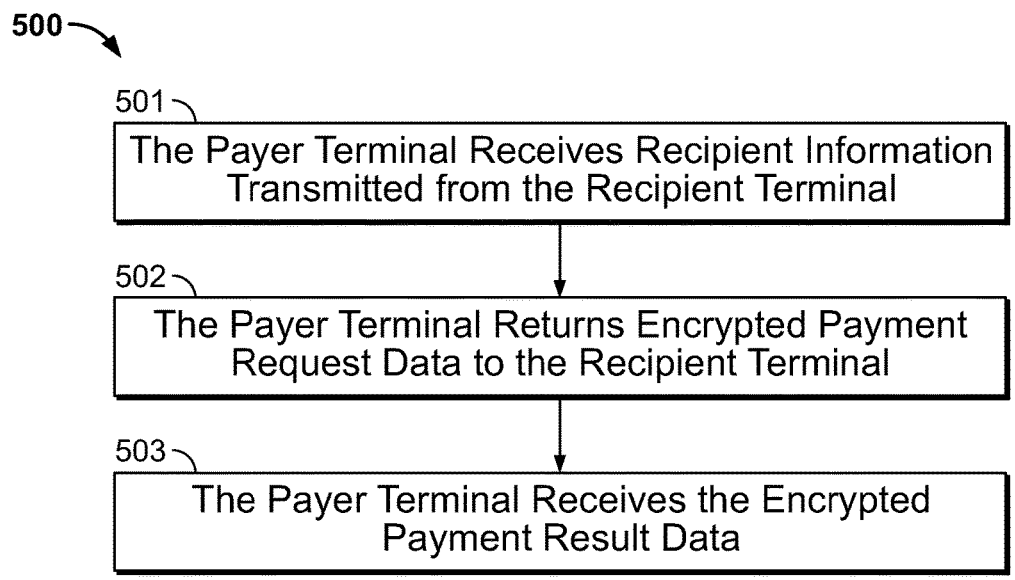
FIG. 5 is a flowchart illustrating an embodiment of a procedure for payer terminal-side payment data processing.

FIG. 5 is a flowchart illustrating an embodiment of a procedure for payer terminal-side payment data processing.

At 501, the payer terminal receives recipient information transmitted from the recipient terminal.

The recipient information transmitted from the recipient terminal to the payer terminal includes a recipient account number and a payment serial number provided by the payment server for the recipient terminal and also may include a payment amount confirmed from the recipient terminal.

At 502, the payer terminal returns encrypted payment request data to the recipient terminal.

The payment request data includes payer information, the recipient information and the payment amount. The recipient terminal forwards the encrypted payment request data and the payment amount to the payment server, which verifies the encrypted payment request data and the payment amount, performs the payment according to a verification result and generates encrypted payment result data.

At 503, the payer terminal receives the encrypted payment result data, and the current flow ends.

Particularly, the payer terminal can receive the encrypted payment result data returned directly from the payment server. For example, if the payer terminal sets up a wireless network connection with the payment server, the payment result data can be transmitted over the wireless network. Alternatively, the payer terminal can receive the encrypted payment result data returned from the payment server to the recipient terminal and then forwarded from the recipient terminal. For example, if the recipient terminal sets up a wireless network connection only with the payment server but is connected with the payer terminal via a wired or wireless connection, the payment result data is forwarded from the recipient terminal.

Figure 6:
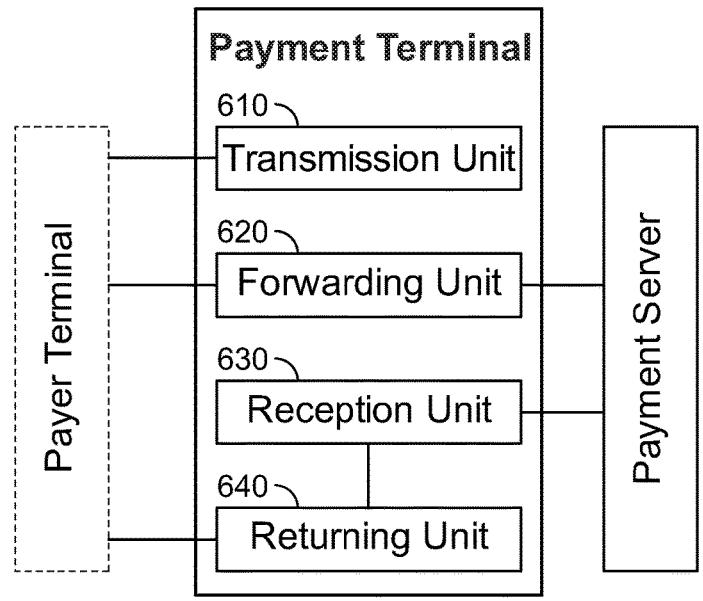
FIG. 6 is a block diagram illustrating an embodiment of a payment terminal.

FIG. 6 is a block diagram illustrating an embodiment of a payment terminal. The payment terminal may be a recipient terminal in a procedure of processing payment data in a practical application.

The payment terminal includes a transmission unit 610, a forwarding unit 620, a reception unit 630, and a returning unit 640.

Particularly, the transmission unit 610 is adapted to transmit recipient information to a payer terminal.

The forwarding unit 620 is adapted to receive encrypted payment request data returned from the payer terminal and to forward the encrypted payment request data and the payment amount to a payment server, where the payment request data includes payer information, the recipient information and a payment amount.

The reception unit 630 is adapted to receive the encrypted payment request data and the payment amount verified by the payment server and to return encrypted payment result data after performing a payment according to a verification result.

The returning unit 640 is adapted to return the encrypted payment result data to the recipient terminal.

Figure 7:
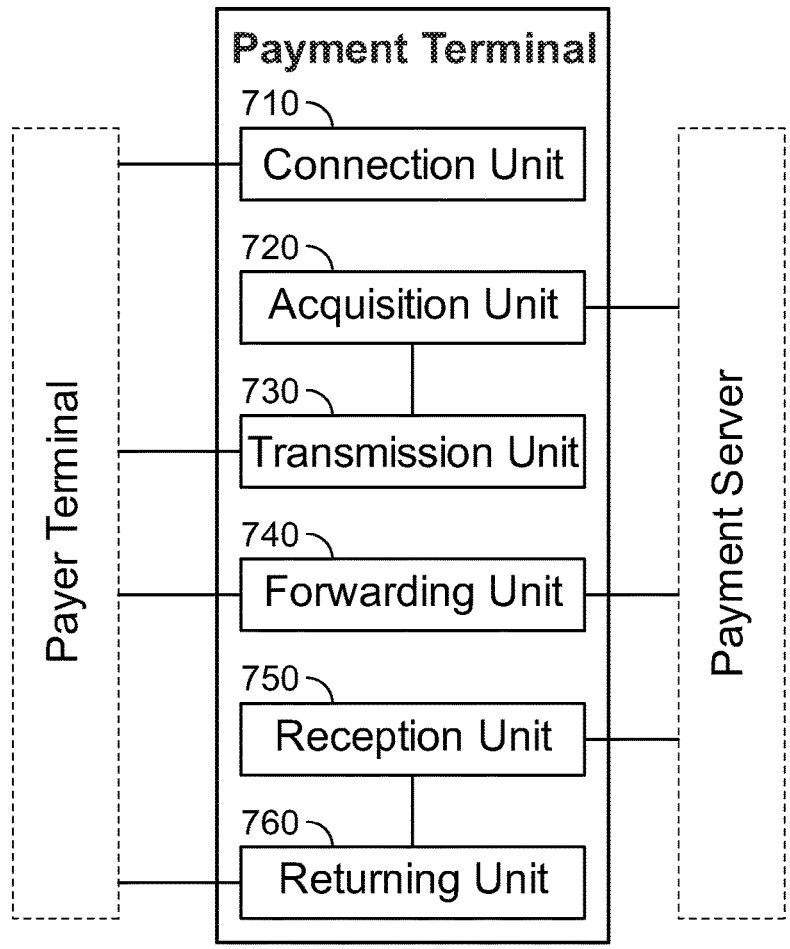
FIG. 7 is a block diagram of another embodiment of a payment terminal.

FIG. 7 is a block diagram of another embodiment of a payment terminal. The payment terminal may be a recipient terminal in a procedure of processing payment data in a practical application.

The payment terminal includes a connection unit 710, an acquisition unit 720, a transmission unit 730, a forwarding unit 740, a reception unit 750, and a returning unit 760.

Particularly, the connection unit 710 is adapted to connect with a payer terminal upon initiation of a payment wirelessly, e.g., through Bluetooth, infrared, WIFI, etc., or in wire, e.g., through USB.

The acquisition unit 720 is adapted to receive a payment serial number identifying uniquely the current payment provided by a payment server.

The transmission unit 730 is adapted to transmit, to the payer terminal, recipient information including a payment serial number.

The forwarding unit 740 is adapted to receive encrypted payment request data returned from the payer terminal and to forward the encrypted payment request data and the payment amount to the payment server, where the payment request data includes payer information, the recipient information and a payment amount.

The reception unit 750 is adapted to receive the encrypted payment request data and the payment amount verified by the payment server and to return encrypted payment result data after performing a payment according to a verification result.

The returning unit 760 is adapted to return the encrypted payment result data to the recipient terminal.

Figure 8:
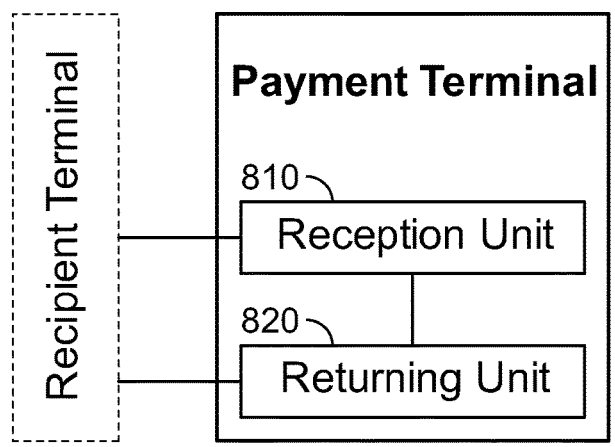
FIG. 8 is a block diagram illustrating an embodiment of another payment terminal.

FIG. 8 is a block diagram illustrating an embodiment of another payment terminal. The payment terminal may be a payer terminal in a procedure of processing payment data in a practical application.

The payment terminal includes a reception unit 810 and a returning terminal 820.

Particularly, the reception unit 810 is adapted to receive recipient information transmitted from a recipient terminal.

The returning unit 820 is adapted to return, to the recipient terminal, encrypted payment request data, where the payment request data includes payer information, the recipient information and a payment amount, so that after the recipient terminal forwards the encrypted payment request data and the payment amount to a payment server, the payment server verifies the encrypted payment request data and the payment amount, performs a payment according to a verification result and generates encrypted payment result data;

The reception unit 810 is further adapted to receive the encrypted payment result data.

Particularly, the reception unit 810 can receive the encrypted payment result data returned directly from the payment server or the reception unit 810 can receive the encrypted payment result data returned from the payment server to the recipient terminal and then forwarded from the recipient terminal.

Figure 9:
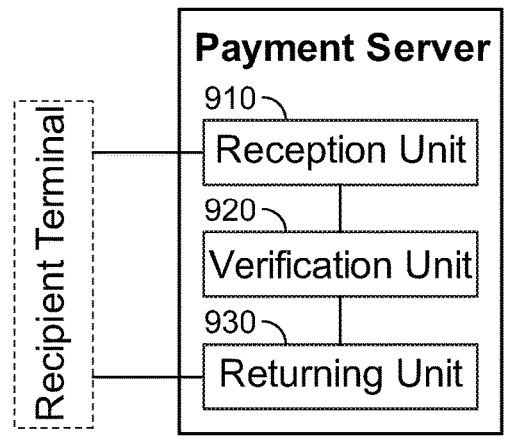
FIG. 9 is a block diagram of a first embodiment of a payment server.

FIG. 9 is a block diagram of a first embodiment of a payment server.

The payment server includes a reception unit 910, a verification unit 920, and a returning unit 930.

Particularly, the reception unit 910 is adapted to receive encrypted payment request data and a payment amount transmitted from a recipient terminal, where the payment request data is payment request data returned from a payer terminal upon reception of recipient information transmitted from the recipient terminal and includes payer information, the recipient information and the payment amount.

The verification unit 920 is adapted to verify the encrypted payment request data and the payment amount and to perform a payment according to a verification result.

The returning unit 930 is adapted to return encrypted payment result data to the recipient terminal.

Figure 10:
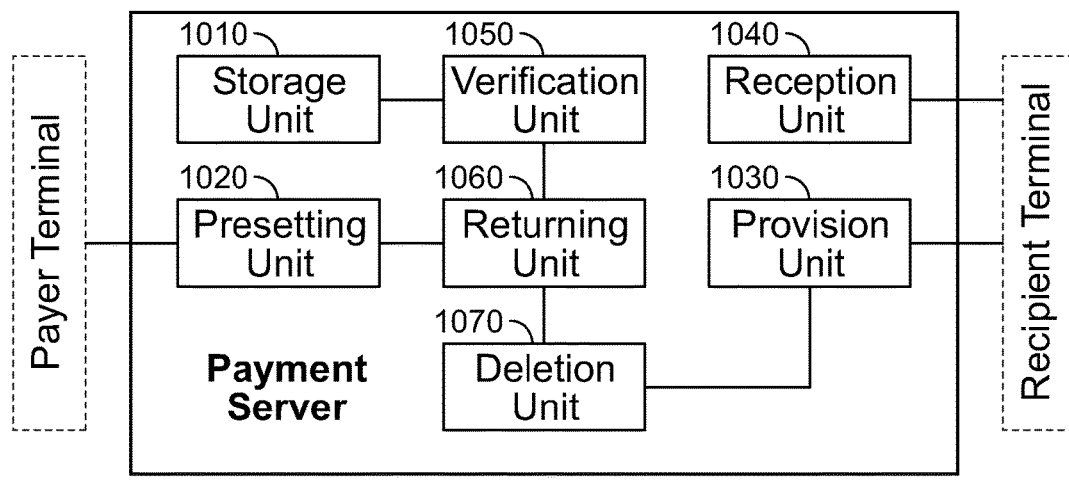
FIG. 10 is a block diagram of a second embodiment of a payment server.

FIG. 10 is a block diagram of a second embodiment of a payment server.

The payment server includes a presetting unit 1010, a storage unit 1020, a provision unit 1030, a reception unit 1040, a verification unit 1050, a returning unit 1060, and a deletion unit 1070.

Particularly, the presetting unit 1010 is adapted to predefine an encryption function with a payer terminal.

The storage unit 1020 is adapted to pre-store a recipient account number, a payer account number, and a payment password.

The provision unit 1030 is adapted to provide a recipient terminal with a payment serial number identifying uniquely a current payment and to store the payment serial number.

The reception unit 1040 is adapted to receive encrypted payment request data and a payment amount transmitted from the recipient terminal, where the payment request data is payment request data returned from a payer terminal upon reception of recipient information transmitted from the recipient terminal and the payment request data includes payer information, the recipient information and the payment amount, where the payer terminal encrypts the payment request data into the encrypted payment request data by the encryption function, the recipient information includes the payment serial number and the recipient account number and the payer information includes the payer account number and the payment password.

The verification unit 1050 is adapted to verify the encrypted payment request data and the payment amount and to perform the payment according to a verification result.

The returning unit 1060 is adapted to return, to the recipient terminal, encrypted payment result data, where payment result data is encrypted into the encrypted payment result data by the encryption function.

The deletion unit 1070 is adapted to delete the payment serial number after the returning unit 860 returns to the recipient terminal the encrypted payment result data, where the encrypted payment result data includes a payment result description indicating whether the payment succeeds or not, the payer information, the recipient information, and the payment amount.

Specifically, the verification unit 1050 includes (not illustrated in FIG. 10): a decryption unit adapted to decrypt the encrypted payment request data into the decrypted payer account number, payment password, recipient account number, payment serial number, and payment amount by the predefined encryption function; a determination unit adapted to determine whether the decrypted payer account number, payment password, recipient account number and payment serial number are consistent respectively with the pre-stored payer account number, payment password, recipient account number and payment serial number and whether the decrypted payment amount is consistent with the received payment amount; and a performing unit adapted to perform the payment by the payment amount and generate the payment result data of a payment success if all the determination results of the determination unit are consistent, otherwise cancel the payment.

The units described above can be implemented as software components executing on one or more general purpose processors, as hardware such as programmable logic devices and/or Application Specific Integrated Circuits designed to perform certain functions or a combination thereof. In some embodiments, the units can be embodied by a form of software products which can be stored in a nonvolatile storage medium (such as optical disk, flash storage device, mobile hard disk, etc.), including a number of instructions for making a computer device (such as personal computers, servers, network equipments, etc.) implement the methods described in the embodiments of the present invention. The units may be implemented on a single device or distributed across multiple devices. The functions of the units may be merged into one another or further split into multiple sub-units.

As can be seen from the foregoing descriptions of the embodiment, in the embodiments of the application, the payer terminal returns the encrypted payment request data to the recipient terminal upon reception of the recipient information transmitted from the recipient terminal, the recipient terminal forwards the encrypted payment request data and the payment amount to the payment server, the payment server verifies the encrypted payment request data and the payment amount and returns the encrypted payment result data to the recipient terminal after performing the payment according to a verification result, and the recipient terminal returns the encrypted payment result data to the payer terminal to thereby accomplish the secure payment procedure. In the procedure of processing payment data according to the embodiment of the application, the payer terminal and the payment server encrypt the payment data independently of the recipient terminal to improve the security and reliability of the payment data in transmission and also ensure the security of personal information of the payer. The embodiment of the application can also be applied in a face-to-face payment scenario without any hardware modification to the terminals, for example, a secure payment of the payer terminal can also be performed through the payment server between two mobile phones to thereby improve a payment experience of a holder of the payer terminal.

As can be seen from the foregoing descriptions of the embodiments, those skilled in the art can clearly understand that the application can be implemented in a manner of software plus an essential general-purpose hardware platform. Based upon such understanding, the technical solutions of the application or the part thereof contributing to the prior art can essentially be embodied in the form of a software product. The computer software product can be stored in a storage medium, e.g., a ROM/RAM, a magnetic disk, an optical disk, etc., and which includes several instructions to cause a computer device (which may be a personal computer, a server, a network device, etc.) to perform the methods according to the respective embodiments of the application or some parts of the embodiments.

The respective embodiments in the specification have been progressively described and their common or similar parts can be taken for mutual reference, and each of the embodiments has placed an emphasis on its difference(s) from other embodiment(s). Especially for the embodiments of the system, they are substantially similar to the embodiments of the method and therefore have been described briefly, and for details thereof, reference can be made to those parts of the descriptions of the embodiments of the method.

The application can be applied in numerous general-purpose or dedicated computer system environments or configurations, e.g., a personal computer, a server computer, a handheld or portable device, a flat panel device, a multiprocessor system, a microprocessor based system, a set-top box, a programmable consumer electronic device, a network PC, a miniaturized computer, a large-scale computer, a distributed computing environment including any of the foregoing systems or devices, etc.

The application can be described in a general context of computer executable instructions, e.g., a program module, executed by a computer. Generally, the program module includes a routine, program, object, component, data structure, etc., which executes a specific task or embodies a specific abstract type of data. Alternatively, the application can be implemented in a distributed computing environment in which a task is executed by a remote processing device connected via a communication network and in which the program module can be located in a local or remote computer storage medium including a storage device.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for processing payment data, comprising:
generating a first payment amount;
transmitting recipient information to a payer terminal, wherein the recipient information comprises a recipient account number, the generated first payment amount, and a payment serial number that uniquely identifies a current payment;
receiving a second payment amount and encrypted payment request data returned from the payer terminal, wherein the encrypted payment request data comprises a third payment amount, payer information, and the recipient information, wherein the second payment amount relates to an unencrypted version of the third payment amount, wherein the payer information includes a payment account number and a payer password, and wherein the encrypted payment request data is encrypted by an encryption technique that is prearranged between the payer terminal and a payment server;
comparing the generated first payment amount with the second payment amount; and
in the event that the generated first payment amount matches the second payment amount:
forwarding the encrypted payment request data and the first payment amount to the payment server for the payment server to:
decrypt, based on the prearranged encryption technique, the encrypted payment request data to obtain unencrypted payer information;
compare the unencrypted payer information with pre-stored payer information; and
in the event that the unencrypted payer information matches the pre-stored payer information: encrypt payment result data, and return the encrypted payment result data;
receiving the encrypted payment result data from the payment server, the encrypted payment result data indicating whether a payment is successfully made by the payment server, wherein the encrypted payment result data includes a payment time and is encrypted using the encryption technique by the payment server; and
returning the encrypted payment result data to the payer terminal, wherein the method is performed by a recipient terminal that is not configured to decrypt the encrypted payment request data.

2. The method according to claim 1, further comprising receiving, from the payment server, the payment serial number.

3. The method according to claim 1, wherein:
the second payment amount is input by the payer terminal.

4. A payment terminal comprising:
a processor configured to:
generate a first payment amount;

transmit recipient information to a payer terminal, wherein the recipient information comprises a recipient account number, the generated first payment amount, and a payment serial number that uniquely identifies a current payment;

receive a second payment amount and encrypted payment request data returned from the payer terminal, wherein the encrypted payment request data comprises a third payment amount, payer information, wherein the second payment amount relates to an unencrypted version of the third payment amount, wherein the payer information includes a payment account number and a payer password, and the recipient information, and wherein the encrypted payment request data is encrypted by an encryption technique that is prearranged between the payer terminal and a payment server;

compare the generated first payment amount with the third payment amount; and in the event that the generated first payment amount matches the third payment amount:
  forward the encrypted payment request data and the first payment amount to the payment server, wherein the payment server is configured to: decrypt, based on the encryption technique, the encrypted payment request data to obtain unencrypted payer information, compare the unencrypted payer information with pre-stored payer information, and in the event that the unencrypted payer information matches the pre-stored payer information: encrypt payment result data, and return the encrypted payment result data;
  receive the encrypted payment result data from the payment server, the encrypted payment result data indicating whether a payment is successfully made by the payment server, wherein the encrypted payment result data includes a payment time and is encrypted using the encryption technique by the payment server; and
  return the encrypted payment result data to the payer terminal, wherein the payment terminal is not configured to decrypt the encrypted payment request data; and a memory coupled to the processor, configured to provide the processor with instructions.

5. A method for processing payment data, comprising:
arranging an encryption technique with a payer terminal;
upon verification, by a recipient terminal, that a recipient generated first payment amount matches a second payment amount received from the payer terminal:
  receiving encrypted payment request data and the second payment amount transmitted from the recipient terminal, wherein the encrypted payment request data is based on payment request data returned from the payer terminal upon receiving recipient information transmitted from the recipient terminal, is encrypted based on the prearranged encryption technique, and comprises payer information, the recipient information and a third payment amount, wherein the second payment amount relates to an unencrypted version of the third payment amount, wherein the recipient information comprises a payment serial number and a recipient account number, and wherein the payer information comprises a payer account number and a payment password;
  decrypting, based on the prearranged encryption technique, the encrypted payment request data to obtain unencrypted payer information;
  comparing the unencrypted payer information with pre-stored payer information; and
  in the event that the unencrypted payer information matches the pre-stored payer information:
    verifying the encrypted payment request data and the first payment amount;
    making a payment according to a result of the verification;
    encrypting payment result data using the prearranged encryption technique; and
    returning an encrypted payment result data to the recipient terminal, wherein the encrypted payment result data includes a payment time, and wherein the recipient terminal is not capable of decrypting the encrypted payment request data.

6. The method according to claim 5, further comprising:
pre-storing a recipient account number, a payer account number and a payment password; and
  providing the recipient terminal with a payment serial number identifying uniquely a current payment, and storing the payment serial number.

7. The method according to claim 6, wherein verifying the encrypted payment request data and the first payment amount and making the payment according to a verification result comprises:
  decrypting the encrypted payment request data into the decrypted payer account number, the payment password, the recipient account number, the payment serial number and the third payment amount by using the predefined encryption function;
  determining whether the decrypted payer account number, the payment password, the recipient account number and the payment serial number are consistent respectively with the pre-stored payer account number, the payment password, the recipient account number and the payment serial number and whether the decrypted third payment amount is consistent with the received first payment amount; and
  if all the data is consistent, making the payment in the first payment amount, and generating the payment result data of a payment success; and
  if the data is inconsistent, cancelling the payment.

8. The method according to claim 5, wherein after the encrypted payment result data is returned to the recipient terminal, the method further comprises:
  deleting the payment serial number; and
  the encrypted payment result data indicates whether the payment is successfully made, the payer information, the recipient information and the first payment amount.

9. A payment server comprising:
a processor configured to:
  arrange an encryption technique with a payer terminal;
  upon verification, by a recipient terminal, that a recipient generated first payment amount matches a second payment amount received from the payer terminal:
    receive encrypted payment request data and the second payment amount transmitted from the recipient terminal, wherein the encrypted payment request data is based on payment request data returned from the payer terminal upon receiving recipient information transmitted from the recipient terminal, is encrypted based on the prearranged encryption technique, and comprises payer information, the recipient information and a third payment amount, wherein the second payment amount relates to an unencrypted version of the third payment amount, wherein the recipient information comprises a payment serial number and a recipient account number, and wherein the payer information comprises a payer account number and a payment password;

decrypt, based on the prearranged encryption technique, the encrypted payment request data to obtain unencrypted payer information;

compare the unencrypted payer information with pre-stored payer information; and in the event that the unencrypted payer information matches the pre-stored payer information:
   verify the encrypted payment request data and the first payment amount;
   make a payment according to a result of the verification;
   encrypt payment result data using the prearranged encryption technique; and
   return the encrypted payment result data to the recipient terminal, wherein the encrypted payment result data includes a payment time, and wherein the recipient terminal is not configured to decrypt the encrypted payment request data; and a memory coupled to the processor, configured to provide the processor with instructions.

10. A method for processing payment data, comprising:
arranging an encryption technique with a payment server;
receiving recipient information transmitted from a recipient terminal, wherein the recipient information comprises a recipient account number, a generated first payment amount, and a payment serial number that uniquely identifies a current payment;
returning to the recipient terminal a second payment amount and encrypted payment request data comprising payer information, the recipient information and a third payment amount, the encrypted payment request data being encrypted, by the payment server, based on the prearranged encryption technique and being forwarded by the recipient terminal to the payment server to be verified, wherein the second payment amount relates to an unencrypted version of the third payment amount, wherein the payment server is configured to: decrypt, based on the prearranged encryption technique, the encrypted payment request data to obtain unencrypted payer information, compare the unencrypted payer information with pre-stored payer information, and in the event that the unencrypted payer information matches the pre-stored payer information: encrypt payment result data, and return the encrypted payment result data to the recipient terminal, wherein the payer information comprises a payer account number and a payment password, wherein the recipient terminal is not configured to decrypt the encrypted payment request data, and wherein the recipient terminal compares the second payment amount with the recipient generated first payment amount; and in the event that the second payment amount matches the recipient generated first payment amount, receiving encrypted payment result data from the payment server, the encrypted payment result data being generated based on verification of the encrypted payment request data and whether a payment is successfully made, wherein the encrypted payment result data includes a payment time and is encrypted using the encryption technique by the payment server.

11. The method according to claim 10, wherein the encrypted payment result data is returned directly from the payment server.

12. The method according to claim 10, wherein the encrypted payment result data is received from a recipient terminal that received the encrypted payment result data from the payment server and forwarded the encrypted payment result data.

13. A payer terminal comprising:
a processor configured to:
   arrange an encryption technique with a payment server;
   receive recipient information transmitted from a recipient terminal, wherein the recipient information comprises a recipient account number, a generated first payment amount, and a payment serial number that uniquely identifies a current payment;
   return to the recipient terminal a second payment amount and encrypted payment request data comprising payer information, the recipient information and a third payment amount, the encrypted payment request data being encrypted, by the payment server, based on the prearranged encryption technique and being forwarded by the recipient terminal to the payment server to be verified, wherein the second payment amount relates to an unencrypted version of the third payment amount, wherein the payment server is configured to: decrypt, based on the prearranged encryption technique, the encrypted payment request data to obtain unencrypted payer information, compare the unencrypted payer information with pre-stored payer information, and in the event that the unencrypted payer information matches the pre-stored payer information: encrypt payment result data, and return the encrypted payment result data to the recipient terminal, wherein the payer information comprises a payer account number and a payment password, and wherein the recipient terminal compares the second payment amount with the recipient generated first payment amount; and
   in the event that the second payment amount matches the recipient generated first payment amount, receive encrypted payment result data from the payment server, the encrypted payment result data being generated based on verification of the encrypted payment request data and whether a payment is successfully made, wherein the encrypted payment result data includes a payment time and is encrypted using the encryption technique by the payment server, and wherein the recipient terminal is not configured to decrypt the encrypted payment request data; and a memory coupled to the processor, configured to provide the processor with instructions.

14. A system for processing payment data, comprising a payer terminal, a recipient terminal and a payment server, wherein:
the payer terminal is adapted to arrange an encryption technique with the payment server and to return, to the recipient terminal, a second payment amount and encrypted payment request data upon reception of the recipient information transmitted from the recipient terminal, wherein the payment request data comprises payer information, recipient information and a third payment amount, wherein the second payment amount relates to an unencrypted version of the third payment amount, wherein the recipient information comprises a recipient account number and a payment serial number that uniquely identifies a current payment, and wherein the payer information comprises a payer account number and a payment password;

the recipient terminal is adapted to generate a first payment amount, compare the generated first payment amount with the second payment amount, and in the event that the generated first payment amount matches the second payment amount, forward the encrypted payment request data and the first payment amount to the payment server;

the payment server is configured to: receive the encrypted payment request data from the recipient terminal, decrypt, based on the prearranged encryption technique, the encrypted payment request data to obtain unencrypted payer information, compare the unencrypted payer information with pre-stored payer information, and in the event that the unencrypted payer information matches the pre-stored payer information: encrypt payment request data using the prearranged encryption technique to generate the encrypted payment request data, return the encrypted payment result data to the recipient terminal, wherein the encrypted payment result data includes a payment time, and wherein the recipient terminal is not configured to decrypt the encrypted payment request data; and the recipient terminal is further adapted to receive the encrypted payment result data from the payment server, and return the encrypted payment result data to the payer terminal.

15. The method according to claim 1, wherein the processor is further configured to:

forward a public key from the payment server to be used by the payer terminal to encrypt the payment request data.

* * * * *